United States Patent [19]

Takahashi et al.

[11] Patent Number: 5,338,267
[45] Date of Patent: Aug. 16, 1994

[54] WORM DIFFERENTIAL GEAR MECHANISM

[75] Inventors: Satoshi Takahashi; Isao Ishikawa, both of Konan, Japan

[73] Assignee: Zexel Corporation, Tokyo, Japan

[21] Appl. No.: 897,107

[22] Filed: Jun. 11, 1992

[30] Foreign Application Priority Data

Jun. 20, 1991 [JP] Japan .............. 3-055252[U]

[51] Int. Cl.$^5$ ............................................. F16H 1/30
[52] U.S. Cl. ..................................................... 475/227
[58] Field of Search ...................... 475/226, 227, 333

[56] References Cited

U.S. PATENT DOCUMENTS

| 1,354,937 | 10/1920 | Alcorn | 475/227 |
| 3,875,824 | 4/1975 | Benjamin | 475/227 X |
| 4,878,400 | 11/1989 | Kimura | 475/227 |
| 4,926,711 | 5/1990 | Arakawa | 475/227 |
| 5,127,889 | 7/1992 | Suzuki | 475/227 |

FOREIGN PATENT DOCUMENTS

| 3632104 | 1/1988 | Fed. Rep. of Germany | 475/226 |
| 1-87940 | 4/1989 | Japan | 475/226 |
| 2-66343 | 3/1990 | Japan | 475/226 |
| 2-66344 | 3/1990 | Japan | 475/226 |

Primary Examiner—Dirk Wright

[57] ABSTRACT

In a worm differential gear mechanism, journal pin insertion ports which are formed on a side face of a differential case between openings for attaching element gears are formed apart from portions of the differential case where maximum loads work. That is, the journal pin insertion ports formed on the top side of the differential case are formed at portions on the top side of the differential case in vicinity of one opening for attaching element gears which is opposing portions on the top side of said differential case in vicinity of the other opening for attaching element gears where maximum loads work. The journal pin insertion ports formed on the bottom side of the differential case are formed at portions on the bottom side of the differential case in vicinity of the other opening for attaching element gears which is opposing portions on the bottom side of the differential case in vicinity of one opening for attaching element gears where maximum loads work. Since the journal pin insertion ports are not formed at portions where maximum loads work, strength of the differential case can be raised without increasing an outside diameter of the differential case.

10 Claims, 5 Drawing Sheets

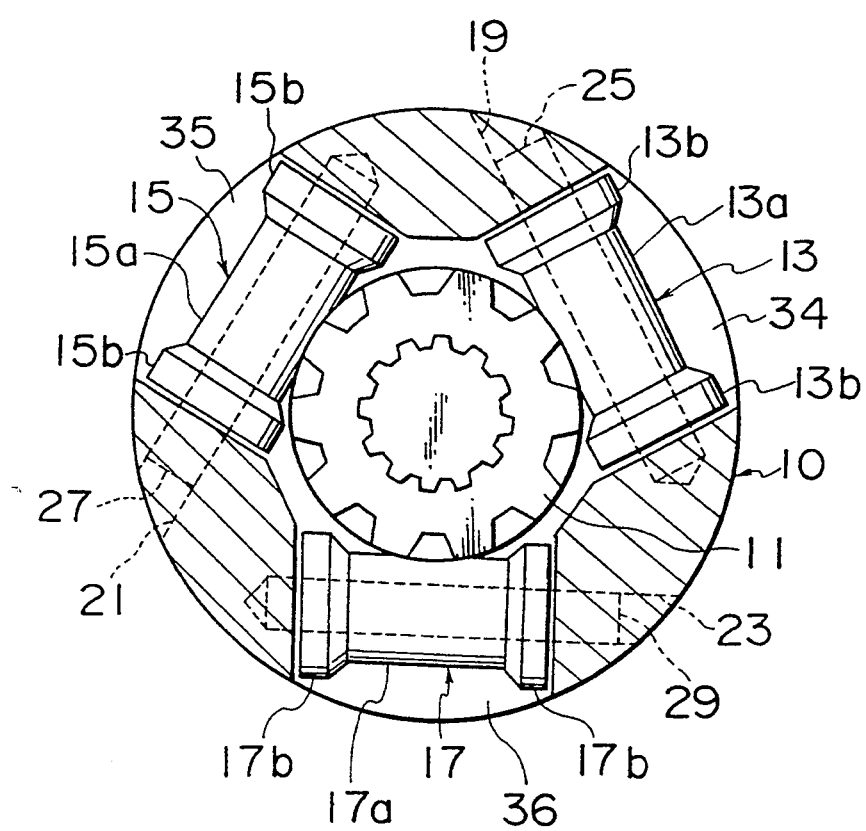

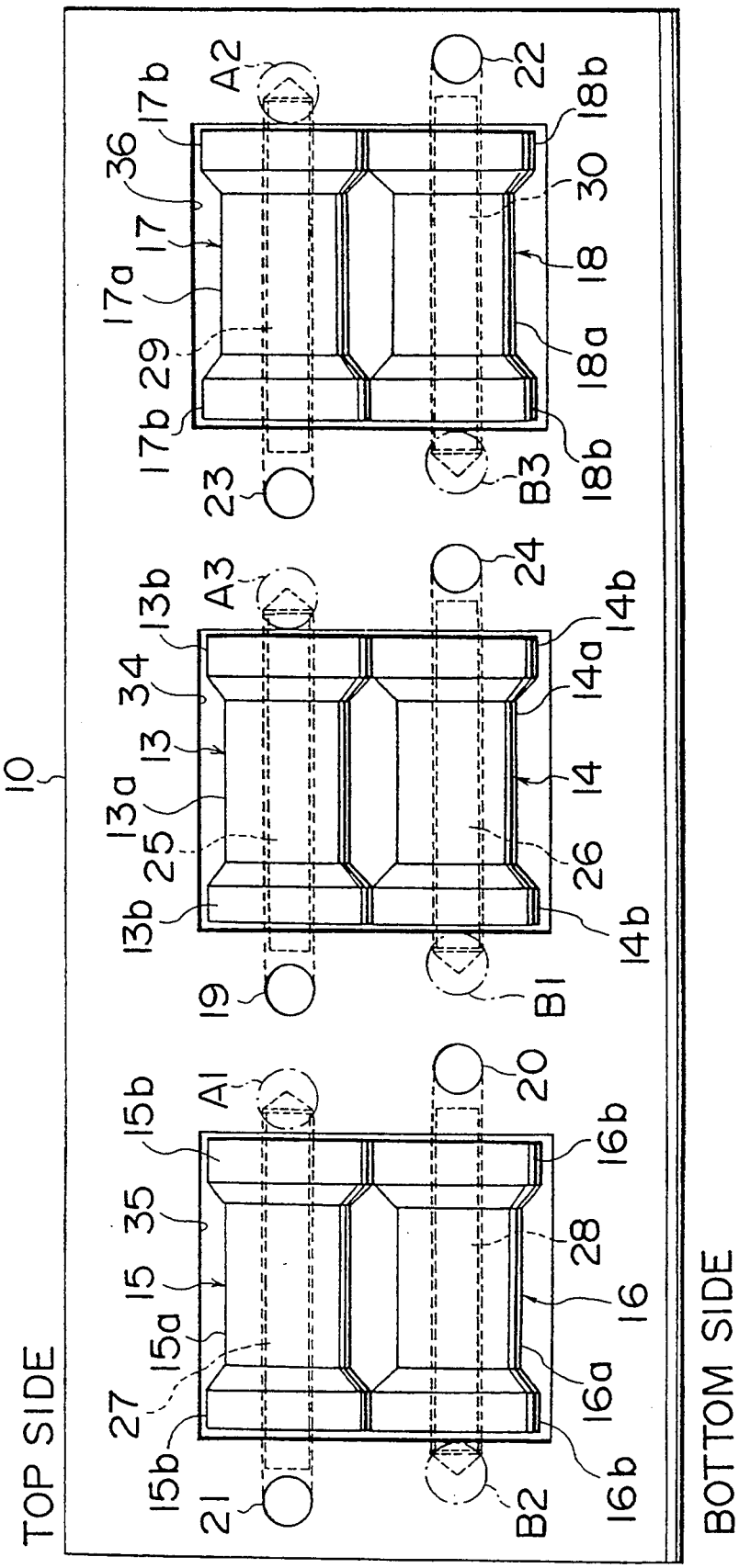

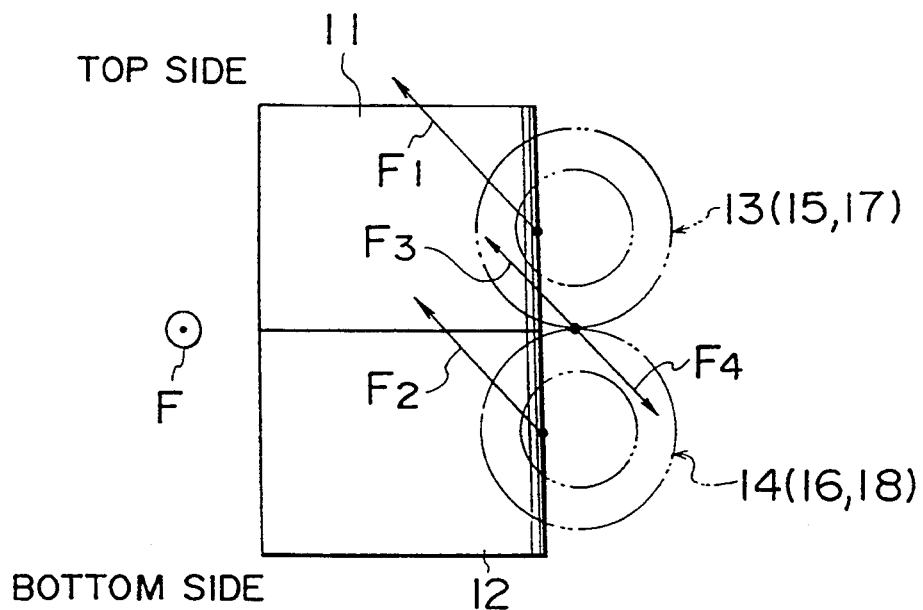
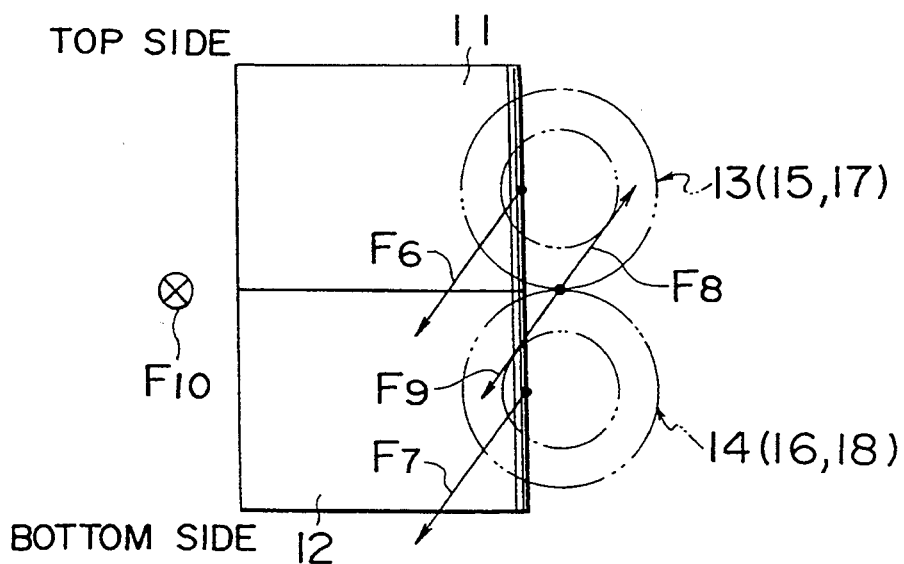

WORM DIFFERENTIAL GEAR MECHANISM

BACKGROUND OF THE INVENTION

The present invention relates to a worm differential gear mechanism for using a worm gear connection.

An example of prior art related to the present invention is shown in the Japanese Utility Model Laid Open Publication No. 2-117457. This has a differential case, a pair of worm gears and a plurality of element gears. The differential case is rotated by an engine via a ring gear which is provided in an outside circumference of a bottom side of differential case. The differential case retains two axle shafts in a rotatable condition, one of the top side where no ring gear is provided and the other on the bottom side where a ring gear is provided. A pair of worm gears are provided in a serial arrangement and are rotatable in the differential case, and are each connected with the different axle shafts. The element gears are each composed of a worm wheel, and spur gears provided on both sides of the worm gear. The element gears are arranged in one set of two element gears and a plurality of sets are provided at openings for attaching element gears which are formed on a side face of the differential case. A plurality of sets of element gears are provided around the worm gears so as to intersect orthogonally with the worm gears. These element gears are retained in the differential case and are rotatable. Each set of element gears of their spur gears engage with each other, and their worm wheels engage with each of the worm gears.

In the above-mentioned worm differential gear mechanism, as shown in FIG. 6, journal pin insertion ports on the top and bottom sides of the differential case are formed in line along an axial direction of the differential case in vicinity of the same opening for attaching element gears which is located on a side face of the differential case between openings for attaching element gears. And, each of a set of element gears is rotatably retained by the differential case by means of journal pins which are inserted into journal pin insertion ports of the top and bottom sides.

FIG. 6 is a development of the differential case showing journal pin insertion ports and an inserted condition of journal pins in the above-mentioned worm differential gear mechanism. In FIG. 6, a reference numeral 1 is the differential case, reference numerals 2a, 2b and 2c are openings for attaching element gears, reference numerals 3a, 3b, 3c, 3d, 3e and 3f are element gears, reference numerals 4a, 4b, 4c, 4d, 4e and 4f are journal pin insertion ports, and reference numerals 5a, 5b, 5c, 5d, 5e and 5f are journal pins. The journal pin insertion port 4a on the top side and the journal pin insertion port 4b on the bottom side are formed in line along an axial direction of the differential case 1 in vicinity of the opening 2a for attaching element gears. And, the journal pin 5a on the top side and the journal pin 5b on the bottom side retain a set of element gears 3a and 3b rotatably to the differential case 1. Other journal pin insertion ports (4c, 4d) and (4e, 4f) and journal pins (5c, 5d) and (5e, 5f) also constitute the same composition in regard to the openings 2b and 2c for attaching element gears and the element gears (3c, 3d) and (3e, 3f).

In the mean time, in case of this type of worm differential gear mechanism, and taking a side face of the differential case 1 between the openings 2a and 2b for attaching element gears for example, a maximum load works on a portion A1 on the top side of the differential case 1, which is located in vicinity of one opening 2a for attaching element gears, during driving when a drive system drives the differential case 1 rotationally towards a forward direction of a car via the ring gear, and, during coasting such as engine braking when the axle shafts drive the differential case 1 rotationally towards a forward direction of the car, the maximum load works on a portion B1 on the bottom side of the differential case 1, which is located in vicinity of another opening 2b for attaching element gears. Likewise, between the openings 2a and 2c for attaching element gears, and between the openings 2c and 2b, maximum loads work on top side portions A2 and A3 during driving, and on bottom side portions B2 and B3 during coasting. During reverse driving and coasting, these loads occur reversely. During backward driving, maximum loads work on bottom side portions B1, B2 and B3, and in the backward coasting, the maximum loads work on top side portions A1, A2 and A3.

As it is clear from FIG. 6, in case of a conventional worm differential gear mechanism, maximum loads work on portions which are thinned because of insertion ports 4b–4f because journal pin insertion ports 4b, 4d and 4f on the bottom side are located in vicinity of or overlapped with portions B1, B2 and B3 where maximum loads work. Because of this, in case of the ordinary worm differential gear mechanism, big anxiety is left in regard to durability of the differential case. As a method to improve this, enlargement of an outside diameter of the differential case can be considered. However, if the outside diameter is enlarged, it will increase the size of the differential case.

SUMMARY OF THE INVENTION

It is an object, therefore, of the present invention to overcome the disadvantages and limitations of the prior art by a new and improved worm differential gear mechanism.

Another object of the present invention to provide a worm differential gear mechanism which is capable of aiming at an improvement of durability of a differential case without increasing the differential case in size.

The above object is attained by a worm differential gear mechanism comprising; a differential case for retaining rotatably axle shafts at its top and bottom, said differential case being driven rotationally from outside via a gear which is provided on an outer circumference of the bottom side thereof; a pair of worm gears provided in said differential case, each worm gear being connected to said axle shafts, respectively, and said worm gears being arranged coaxially and independently rotatable; a plurality of element gears having a worm wheel and engaging gears which are provided non-rotatably at both ends of the worm wheel, said element gears being arranged in one set of two element gears and a plurality of sets being arranged at a plurality of openings for attaching element gears which are formed on a side face of said differential case, the worm wheel of one element gear of each set being engaged with one of said worm gears and the worm wheel of the other element gear of each set being engaged with the other of said worm gears, and the engaging gears of element gears of each set being engaged with each other; a plurality of journal pin insertion ports which are formed on each of the top side and bottom side of side face of said differential case between said openings for attaching element gears, said journal pin insertion ports which are formed on the top side of said differential case being formed each at a portion of the top side of said differential case in vicinity of one opening for attaching element gears which is opposing a portion of the top side of said differential case in vicinity of the other opening for attaching element gears on which a maximum load works, and said journal pin insertion ports which are formed on the bottom side of said differential case being formed each at a portion of the bottom side of said differential case in vicinity of the other opening for attaching element gears opposing to a portion of the bottom side of said differential case in vicinity of said one opening for attaching element gears on which the maximum load works; and a plurality of journal pins, inserted from said journal pin insertion ports, for retaining each of element gears rotatably to said differential case.

According to a construction like this, strength of portions of the differential case on which maximum loads work will not drop, since the journal pin insertion ports are not formed at portions of the differential case on which maximum loads work. Because in this, an improvement of durability of the differential case can be aimed at without enlarging an outside diameter of the differential case.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing objects features and attendant advantages of the present invention will be appreciated as the same become better understood by means of the following description and accompanying drawings which are given by way of illustration only, and thus are not limitative of the present invention, and wherein;

FIG. 2 is a sectional view taken along a line A—A of FIG. 1;

FIG. 3 is a development of the differential case showing journal pin insertion ports and an inserted condition of journal pins in the construction of FIG. 1;

FIG. 4 is an explanatory drawing showing force-relations during driving when a drive system rotationally drives a differential case, in the construction of FIG. 1;

FIG. 5 is an explanatory drawing showing force-relations during coasting when axle shafts rotationally drive the differential case, in the construction of FIG. 1;

DETAILED DESCRIPTION OF THE INVENTION

Figure 1:
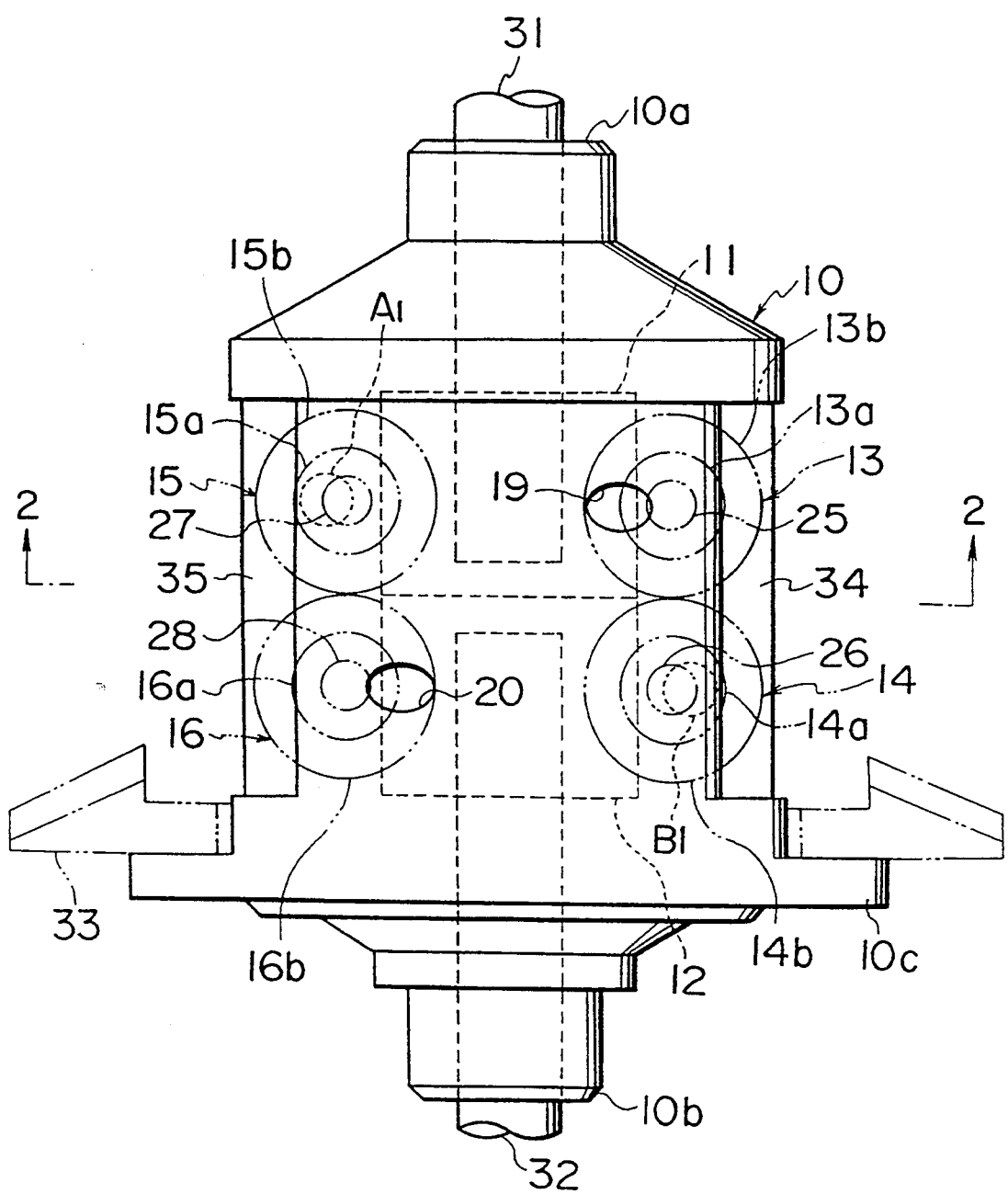
FIG. 1 is a side view showing an embodiment of a worm differential gear mechanism according to the present invention.
Figure 6:
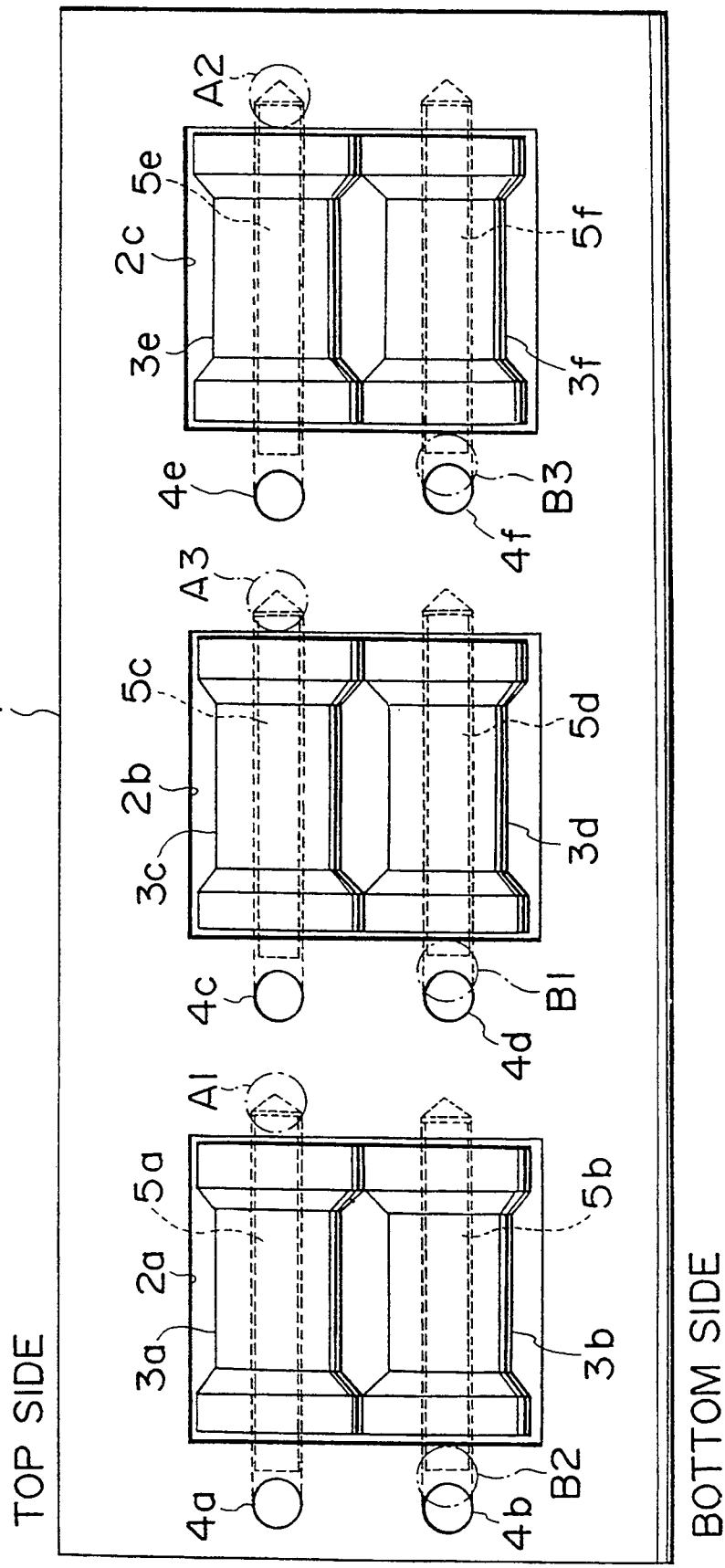
FIG. 6 is a development of the differential case showing journal pin insertion ports and an inserted condition of journal pins in a conventional worm differential gear mechanism.

In FIGS. 1–3, a reference numeral 10 is a differential case, reference numerals 11 and 12 are worm gears, reference numerals 13, 14, 15, 16, 17 and 18 are element gears, reference numerals 19, 20, 21, 22, 23 and 24 are journal pin insertion ports, and reference numerals 25, 26, 27, 28, 29 and 30 are journal pins.

The differential case 10 retains each of the axle shafts 31 and 32 rotatably on a top 10a and a bottom 10b, and a flange 10c on an outer circumference of the bottom 10b side. A ring gear 33 is fixed to the flange 10c. The differential case 10 is rotationally driven by a drive system (not shown in the drawings) by means of an engagement of the ring gear 33 and a hypoid gear (not shown in the drawings). The differential case 10 provides three openings 34, 35 and 36 for attaching element gears on its side face, which are formed with a 120° spacing against the center axis.

The worm gears 11 and 12 are arranged coaxially within the differential case 10, and are each independently rotatable. The worm gears 11 and 12 are each connected to axle shafts 31 and 32 by spline connection, and the axle shafts 31 and 32 rotate by rotation of the worm gears 11 and 12.

The element gears 13–18 have worm wheels 13a, 14a, 15a, 16a, 17a and 18a, and spur gears 13b, 14b, 15b, 16b, 17b and 18b which are respectively provided on both sides of the worm wheels 13a–18a. The element gears 13–18 are arranged in one set of two element gears, and three sets are allocated with a 120° spacing around the worm gears 11 and 12. The element gears 13–18 intersect orthogonally with the worm gears 11 and 12, and are each attached rotatably by the journal pins 25–30 to the openings 34–36 for attaching element gears. In the present embodiment, the element gears 13 and 14 are provided in a pair at the opening 34 for attaching element gears, the element gears 15 and 16 are provided in a pair at the opening 35 for attaching element gears, and the element gears 17 and 18 are provided in a pair to the opening 36 for attaching element gears. For the element gears 13 and 14, the spur gears 13b and 14b engage with each other, the worm wheel 13a of the element gear 13 engages with one worm gear 11, and the worm wheel 14a of the element gear 14 engages with the other worm gear 12. The same construction also applies to the other pairs of element gears.

In case of such a worm differential gear mechanism, during driving when the drive system drives via the ring gear 33 the differential case 10 rotationally towards a forward direction of a car, maximum loads work respectively on a top side portion A1 of the differential case 10 in vicinity of the opening 35 for attaching element gears on the side face of the differential case 10 between the openings 34 and 35 for fitting element gears, and on a top side portion A2 of the differential case 10 in vicinity of the opening 36 for attaching element gears on the side face of the differential case 10 between the openings 35 and 36 for attaching element gears, and on a top side portion A3 of the differential case 10 in vicinity of the opening 34 for attaching element gears on the side face of the differential case 10 between the openings 36 and 34 for fitting element gears.

FIG. 4 is an explanatory drawing showing force-relations during driving. During driving, forces F1 and F2 towards a top-left direction of the drawing work respectively on the element gear 13 (15, 17) on the top 10a side and the element gear 14 (16, 18) on the bottom 10b side due to engagement of the worm gears 11 and 12, and at the same time forces F3 and F4, which work in opposite directions from each other, work towards the top-left direction and towards a bottom-right direction of the drawing, due to engagement of the spur gears of each. The forces F2 and F4 cancel each other on the bottom 10b side, but the forces F1 and F3 add to each other on the top 10a side. These forces are transmitted to the differential case 10 via the journal pin 25 (27, 29) on the top 10a side. Moreover, a force F5 towards a front side of the drawing works on the differential case 10 due to engagement between the ring gear 33 and the hypoid gear. Accordingly, the maximum loads by combination of these forces work on the portions A1, A2 and A3 of the differential case 10.

On the other hand, during coasting such as engine braking when the axle shafts 31 and 32 drive the differential case 10 rotationally towards a forward direction of the car, maximum loads work respectively on a bottom side portion B1 of the differential case 10 in vicinity of the opening 34 for attaching element gears on the side face of the differential case 10 between the openings 34 and 35 for attaching element gears, and on a bottom side portion B2 of the differential case 10 in vicinity of the opening 35 for attaching element gears on the side face of the differential case 10 between the openings 35 and 36 for fitting element gears, and a bottom side portion B3 of the differential case 10 in vicinity of the opening 36 for attaching element gears on the side face of the differential case 10 between the openings 36 and 34 for fitting element gears.

FIG. 5 is an explanatory drawing showing force-relations during coasting. During coasting, forces F6 and F7 towards the bottom-left direction of the drawing work respectively on the element gear 13 (15 and 17) on the top side and the elemnt gear 14 (16 and 18) on the bottom side due to engagement of the worm gears 11 and 12, and at the same time forces F8 and F9, which work in opposite directions from each other, work towards the top-right direction and towards a bottom-left direction of the drawing, due to engagement of the spur gears of each. The forces F6 and F8 cancel each other on the top 10a side, but the forces F7 and F9 add to each other on the bottom 10b side. These forces are transmitted to the differential case 10 via the journal pin 26 (28, 30) on the bottom 10b side. Moreover, a force F10 towards a rear side of the drawing works on the differential case 10 due to engagement between the ring gear 33 and the hypoid gear. Accordingly, the maximum loads by combination of these forces work on the portions B1, B2 and B3 of the differential case 10.

During driving and coasting in the backward direction of the car, the above-mentioned relationship is reversed. That is, during driving, the maximum forces work on the portions B1, B2 and B3 of the bottom 10b side, and during coasting, the maximum forces work on the portions A1, A2 and A3 of the top 10b side.

As it is clear from FIG. 3, the journal pin insertion ports 19–24 are formed at portions opposite from the portions A1–A3 and B1–B3 where the maximum loads work. That is, on the side face of the differential case 10 between the openings 34 and 35 for attaching element gears, the journal pin insertion port 19 of the top 10a side is formed at a portion on the top 10a side of the differential case 10 in vicinity of the opening 34 for attaching element gears which is apart from the portion A1 where the maximum load work, and the journal pin insertion port 20 of the bottom 10b side is formed at a portion on the bottom 10b side of the differential case 10 in vicinity of the opening 35 for attaching element gears which is apart from the portion B1 where the maximum load work. Likewise, between the openings 35 and 36 (36 and 34) for attaching element gears, the journal pin insertion port 21 (23) of the top 10a side is formed at a portion of the top 10a side of the differential case 10 in vicinity of the opening 35 (36) for attaching element gears which is apart from the portion A2 (A3) where the maximum load work, and the journal pin insertion port 22 (24) of the bottom 10b side is formed at a portion of the bottom 10b side of the differential case 10 in vicinity of the opening 36 (34) for attaching element gears which is apart from the portion B2 (B3) where the maximum load work.

Journal pins 25 are inserted from the journal pin insertion ports 19–24, and support the element gears 13–18 of different sets freely rotatably at the openings 34–36 for attaching element gears on the top 10a side and on the bottom 10b side between the openings 34–36 for attaching element gears. That is, between the openings 34 and 35 for attaching element gears, the journal pin 25 on the top 10a side is inserted into the journal pin insertion port 19 and supports the element gear 13 rotatably which is allocated at the opening 34 for attaching element gears, and the journal pin 28 on the bottom 10b side is inserted into the journal pin insertion port 20 and supports the element gear 16 rotatably which is allocated at the opening 35 for attaching element gears. Likewise, between the openings 35 and 36 (36 and 34) for attaching element gears, the journal pin 27 (29) on the top 10a side is inserted into the journal pin insertion port 21 (23) and supports the element gear 15 (17) rotatably which is allocated at the opening 35 (36) for attaching element gears, and the journal pin 30 (26) on the bottom 10b side is inserted into the journal pin insertion port 22 (24) and supports the element gear 18 (14) rotatably which is allocated at the opening 36 (34) for attaching element gears.

According to the above-mentioned construction, because the journal pin insertion ports 19–24 are not provided at the portions A1–A3 and B1–B3 where the maximum loads work, strength of the portions A1–A3 and B1–B3 where the maximum loads work can be raised. Because of this, durability of the differential case can be increased without enlarging the outside diameter of the differential case.

From the foregoing it will now be apparent that a new and improved worm differential gear mechanism has been found. It should be understood, of course, that the embodiments disclosed are merely illustrative and are not intended to limit the scope of the invention. Reference should be made to the appended claims, therefore, rather than the specification, to determine the scope of the invention.

What is claimed is:

1. A worm differential gear mechanism comprising;
   a differential case for retaining rotatably axle shafts at first and second ends thereof, said differential case being driven rotationally from outside via a gear which is provided on an outer circumference of the second end thereof;
   a pair of worm gears provided in said differential case, each worm gear connected to said axle shafts, respectively, and said worm gears being arranged coaxially and being independently rotatable;
   a plurality of element ears, each of said element gears having a worm wheel and at least one spur gear, each of said at least one spur gear being non-rotatably mounted on a respective end of the worm wheel, said element gears being arranged in at least one pair such that the worm wheel of one element gear of the at least one pair meshes with one worm gear, while the worm wheel of the other element gear of the at least one pair meshes with the other worm gear, and each of the at least one spur gear of one element gear of the at least one pair meshes with a corresponding at least one spur gear of the other element gear of the at least one pair, each of said at least one pair of element gears being arranged tangentially to the periphery of its respective worm gear and being rotatably mounted in an opening formed in the differential case and each of said element gears having a first and second end;

a plurality of journal pin insertion ports formed at respective ends of the element gears of said at least one pair, the insertion port of one element gear of each of said at least one pair being located at the first end of said one element gear and of each of said at least one pair, the insertion port of the other element gear of each of said at least one pair being located at the second end of said other element gear and of each of said at least one pair, the first end of the one element gear being opposite to the second end of the other element gear and the second end of the one element gear and the first end of the other element gear being without insertion ports; and a plurality of journal pins, inserted from said journal pin insertion ports, for retaining each of element gears rotatably to said differential case.

2. The worm differential gear mechanism as recited in claim 1, wherein each of the openings for attaching element gears has two journal pin insertion ports in the vicinity thereof, the journal pin insertion ports being on opposed sides of each of the openings for attaching element gears.

3. The worm differential gear mechanism as recited in claim 2, wherein three openings for attaching element gears and six journal pin insertion ports are provided for the worm differential gear mechanism.

4. The worm differential gear mechanism as recited in claim 1, wherein six element gears and six journal pins are provided for the worm differential gear mechanism.

5. The worm differential gear mechanism as recited in claim 4, wherein three openings for attaching element gears are provided for the worm differential gear mechanism, each of the openings for attaching element gears having two journal pin insertion ports on opposite sides thereof.

6. The worm differential gear mechanism as recited in claim 1, wherein the journal pin insertion ports are provided in pairs for each of the openings for attaching element gears, all of the journal pin insertion ports of each pair which are on the first ends of the one element gear being located on the same side of the respective openings for attaching element gears and all of the journal pin insertion ports of each pair which are on the second ends of the other element gear being located on the same side of the respective openings for attaching element gears.

7. The worm differential gear mechanism as recited in claim 6, wherein the side of the openings for attaching element gears having the journal pin insertion ports at the first end of the one element gear is opposite to the side of the openings for attaching element gears having the journal pin insertion ports at the second end of the other element gear.

8. The worm differential gear mechanism as recited in claim 1, wherein the differential case has a face between each of the openings for attaching element gears, a pair of journal pin insertion ports being provided in the face of the differential case between each of the openings, one of the journal pin insertion ports of each pair being located closer to one of the openings for attaching element gears while the other journal pin insertion port of the pair being located closer to the other opening for attaching element gears.

9. The worm differential gear mechanism as recited in claim 1, wherein each opening for attaching element gears has one journal pin insertion port on each side thereof.

10. The worm differential gear mechanism as recited in claim 1, wherein each opening for attaching element gears has a first and second side which are opposed and wherein one journal pin insertion port is provided in the vicinity of the first side of each opening and another journal pin insertion port is provided in the vicinity of the second side of each opening, the journal pin insertion ports in the vicinity of each opening receiving a journal pin.

* * * * *